United States Patent [19]
Stroud

[11] Patent Number: 5,797,654
[45] Date of Patent: Aug. 25, 1998

[54] BELT BUCKLE/TETHER STRAP FOR BOOSTER CAR SEAT

[76] Inventor: David J. Stroud, 360 Mappletrace Trail, Dayton, Ohio 45458

[21] Appl. No.: 736,741

[22] Filed: Oct. 25, 1996

[51] Int. Cl.⁶ .......................... A47D 15/00; B60R 21/00; B60R 22/30
[52] U.S. Cl. ................ 297/483; 297/250.1; 280/808; 24/196; 24/200
[58] Field of Search .................. 297/483, 250.1, 297/468, 485; 280/808; 24/196

[56] References Cited

U.S. PATENT DOCUMENTS

| | | |
|---|---|---|
| 820,710 | 5/1906 | Ford . |
| 2,260,060 | 10/1941 | Shaulson ............................ 24/200 |
| 2,643,431 | 6/1953 | Schwarz ............................ 24/200 |
| 4,236,755 | 12/1980 | Pollitt et al. ........................ 297/483 |
| 4,275,923 | 6/1981 | Molnar ............................. 297/250.1 |
| 4,461,510 | 7/1984 | Cunningham et al. ........... 297/483 X |
| 4,786,078 | 11/1988 | Schreier et al. ................. 297/483 X |
| 4,832,367 | 5/1989 | Lisenby ........................... 297/483 X |
| 4,893,835 | 1/1990 | Linden ............................ 297/483 X |
| 5,088,161 | 2/1992 | Robertson ....................... 297/483 X |
| 5,135,257 | 8/1992 | Short .............................. 297/483 X |
| 5,154,446 | 10/1992 | Blake .............................. 297/483 X |
| 5,215,333 | 6/1993 | Knight ............................ 297/483 X |
| 5,265,910 | 11/1993 | Barr et al. ...................... 297/483 X |
| 5,308,116 | 5/1994 | Zawisa et al. .................. 297/483 X |
| 5,340,198 | 8/1994 | Murphy et al. ..................... 297/483 |
| 5,432,985 | 7/1995 | Bernart ............................... 24/265 |
| 5,472,236 | 12/1995 | Gray .............................. 297/483 X |
| 5,605,380 | 2/1997 | Gerstenberger et al. ............. 297/483 |

Primary Examiner—Peter M. Cuomo
Assistant Examiner—Rodney B. White

[57] ABSTRACT

A device for use in safely positioning a shoulder belt upon a child seated in a booster set, the strap comprising in combination with a shoulder belt positioning strap, the strap having a first end, a second end and an intermediate extent therebetween means to couple the first end of the belt to a booster seat; a shoulder belt clip secured to the second end of the belt; and the shoulder belt clip having a semicircular recess at a lower extent adapted to receive the second end of the strap, the shoulder belt clip having an opened upper extent, an aperture with diametrically opposed inwardly directed protrusions, the aperture formed intermediate the super and lower extents of the shoulder belt clip, the opened upper extent and the aperture together adapted to removably engage the shoulder belt.

4 Claims, 5 Drawing Sheets

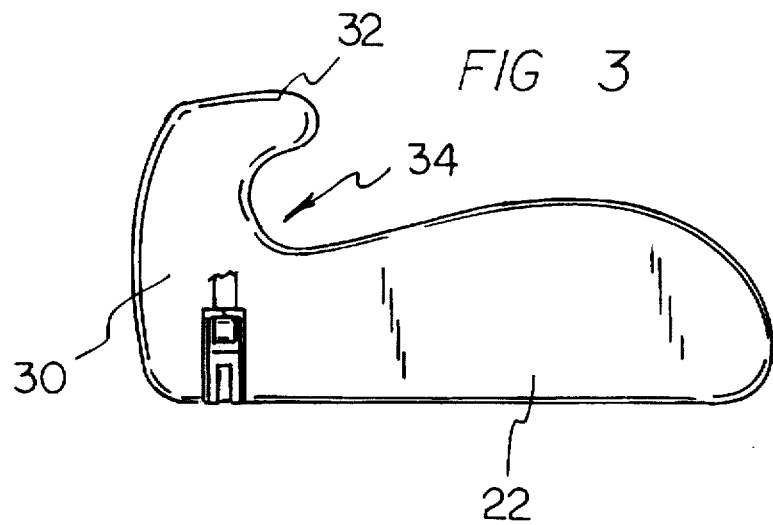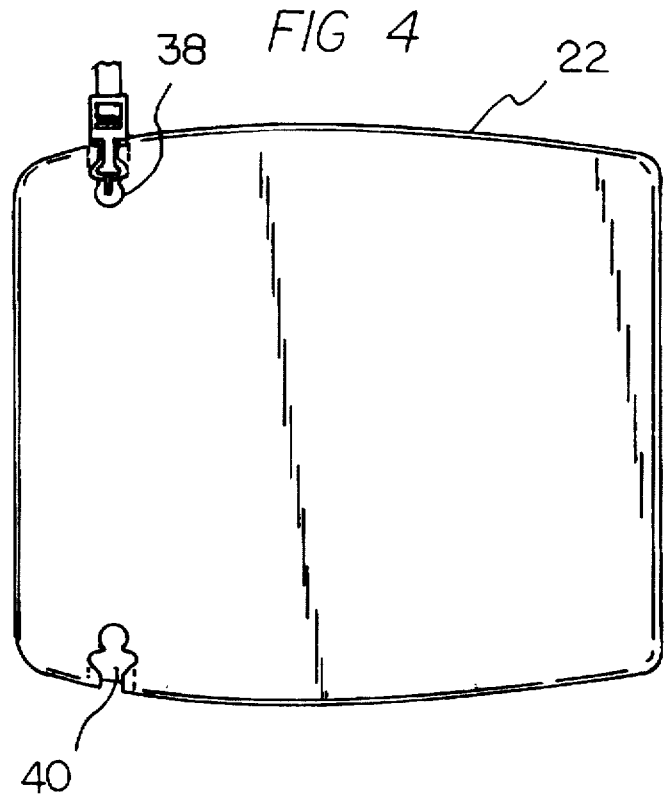

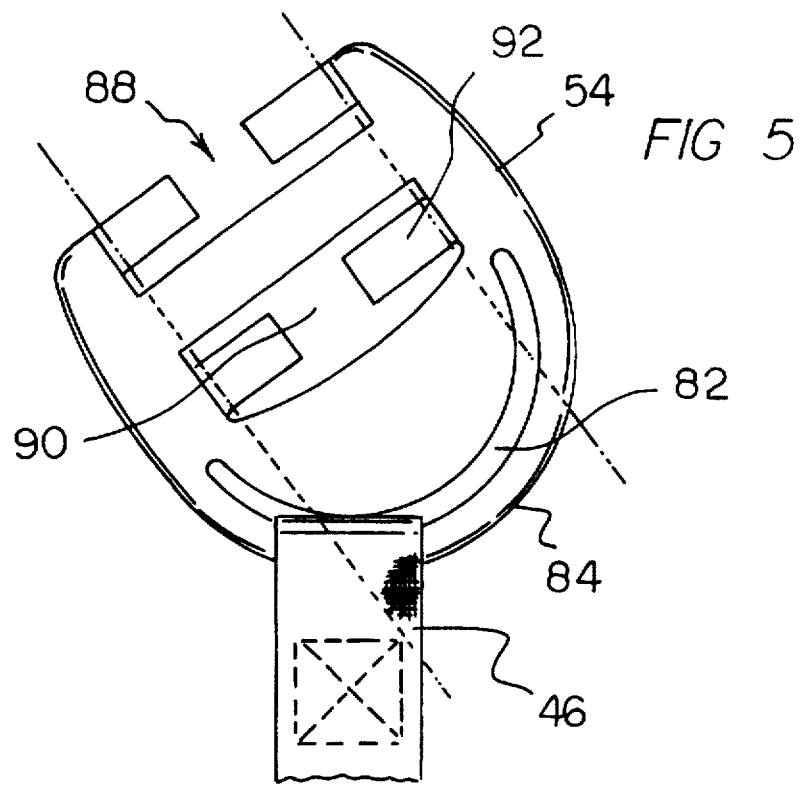
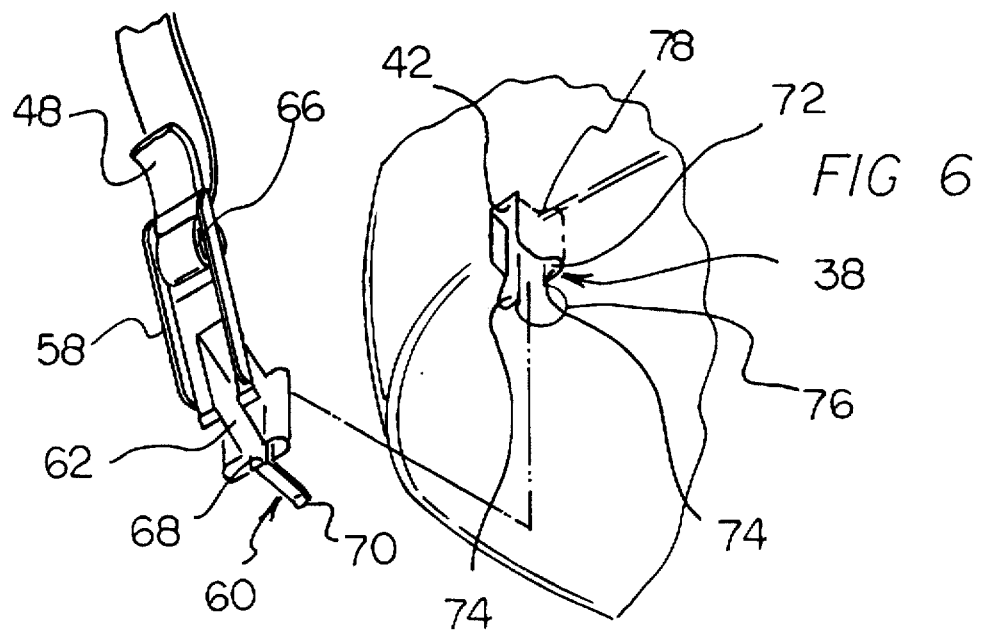

FIG 7
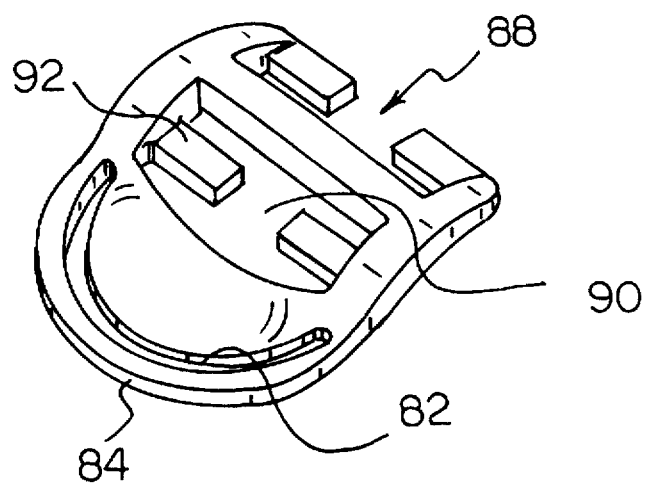
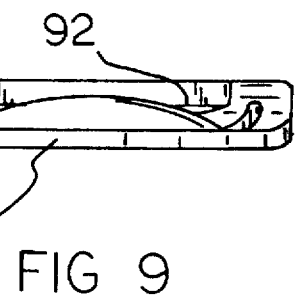
FIG 9
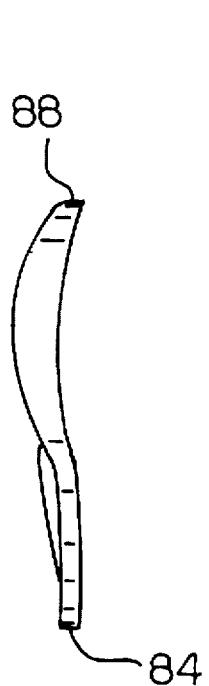
FIG 8

5,797,654

1

BELT BUCKLE/TETHER STRAP FOR BOOSTER CAR SEAT

BACKGROUND OF THE INVENTION

1. Field of the Invention

The present invention relates to a belt buckle/tether strap for a booster seat, more particularly, to a vehicle booster seat for children with an associated device to reposition a shoulder belt of a combination shoulder and lap belt normally found in a vehicle.

2. Description of the Prior Art

The use of booster seats for receiving and supporting children in a vehicle seat is well known. Further, vehicle seat belts formed of a combination shoulder belt and lap belt are also well known. The present invention relates to a device to reposition the shoulder belt of a typical Type II auto restraint system, combination shoulder and lap belt. When a Type II auto restraint is used with young children and some adults, the shoulder belt comes into contact with the occupant at or above the collar bone which is uncomfortable to the user. As a result, the user will sometimes avoid this discomfort by placing the shoulder belt behind them which is less than desirable in terms of restraining the occupant in the event of a collision. The present invention provides a way to reposition the auto belt in a way that is comfortable so that the full safety benefits of the Type II restraint can be realized.

The patent literature discloses various booster seats and shoulder/lap belts and coupling components therebetween. Note, for example, U.S. Pat. No. 4,463,984 to Molnar; U.S. Pat. No. 4,461,510 to Cunningham, et al.; Des. U.S. Pat. No. 356,658 to Bernart; U.S. Pat. No. 5,432,985 to Bernart, U.S. Pat. No. 820,710 to Ford, U.S. Pat. No. 2,643,431 to Schwarz; and U.S. Pat. No. 2,260,060 to Shaulson.

None of the devices provides the safety and convenience attended with the present invention, the belt positioner to route the shoulder belt of an auto restraint.

The present invention achieves its intended purposes, objects and advantages over the prior art through a new, useful and unobvious combination of components elements, through the use of a minimum number of functioning parts, at a reasonable cost to manufacture, and through the utilization of only readily available and conventional materials.

Therefore, the present invention relates to a new and improved device for use in safely positioning a shoulder belt upon a child seated in a booster seat, the strap comprising in combination with a shoulder belt positioning strap, the strap having a first end, a second end and an intermediate extent therebetween, means to couple the first end of the belt to a booster seat; a shoulder belt clip secured to the second end of the belt; and the shoulder belt clip having a semicircular recess at a lower extent adapted to receive the second end of the strap, the shoulder belt clip having an opened upper extent, an aperture with diametrically opposed inwardly directed protrusions, the aperture formed intermediate the super and lower extents of the shoulder belt clip, the opened upper extent and the aperture together adapted to removably engage the shoulder belt.

Therefore, it is an object of this invention to provide a belt positioner to route the shoulder belt of an auto restraint which overcomes the inadequacies of the prior art devices and which constitutes an improvement which is a significant contribution to the advancement of the art.

Another object of the invention is to provide for the convenient usage of a belt positioner to route the shoulder belt of an auto restraint with maximum safety and convenience.

2

It is another object of the present invention to maximize the safety of a belt positioner to route the shoulder belt of an auto restraint which may be easily and efficiently manufactured and marketed.

It is further object of the present invention to provide a belt positioner to route the shoulder belt of an auto restraint construction which is of a durable and reliable construction.

The foregoing has outlined some of the more pertinent objects of the present invention. These objects should be construed to be merely illustrative of some of the more prominent features and applications of the intended invention. Many other beneficial results could be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention as defined by the claims taken in conjunction with the accompanying drawings.

SUMMARY OF THE INVENTION

The invention is defined by the appended claims with the specific embodiment shown on the attached drawings. For the purposes of summarizing the invention, the invention essentially comprises a booster seat in combination with a detachable strap with releasable components at its opposite ends for coupling between the booster seat and a vehicle shoulder belt.

More specifically, the present invention relates to a seat system for use in safely and conveniently supporting a child upon a vehicle seat that has both a lap belt and a shoulder belt, the seat system comprising in combination with a booster seat having a first side, a second side, a rearward portion and a forward portion, both the first and second sides including an integrally formed upwardly extending rearward side portion, both the first and second sides further including an integrally formed upwardly extending forward side portion and a lap belt receiving channel formed intermediate the rearward and forward side portions of the first and second sides, a first clip receiving groove with a stop plate thereabove positioned on the first side rearward portion of the seat, a second clip receiving groove with a stop plate thereabove positioned on the second side rearward portion of the seat; a shoulder belt positioning strap, the strap having a first end, a second end and an intermediate extent therebetween; a booster seat clip secured to the first end of the belt; a shoulder belt clip secured to the second end of the belt; the booster seat clip having a belt engaging portion and a booster seat engaging portion, the belt engaging portion being slidably secured to the first end of the strap, the seat engaging portion adapted to be removably secured within either of two clip receiving grooves of the seat; and the shoulder belt clip having a semicircular recess at a lower extent adapted to receive the second end of the strap, the shoulder belt clip having an opened upper extent, an aperture with diametrically opposed inwardly directed protrusions, the aperture formed intermediate the upper and lower extents of the shoulder belt clip, the opened upper extent and the aperture together adapted to removably engage the shoulder belt.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. Its should be appreciated by those skilled in the art that the conception and the disclosed specific embodiment may be readily utilized as a basis for modifying or designing other structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which;

FIGS. 3 and 4 are side and bottom elevational views of the seat and strap shown in FIG. 2.

FIG. 5 is a front elevational view of the upper portion of the strap and the upper buckle.

FIG. 6 is an exploded perspective view of the lower portion of the strap, the lower buckle and a portion of the seat.

FIGS. 7, 8 and 9 are a perspective, side and front view of the upper buckle.

The same reference numerals refer to the same parts through the various Figures.

DESCRIPTION OF THE PREFERRED EMBODIMENT

Figure 1:
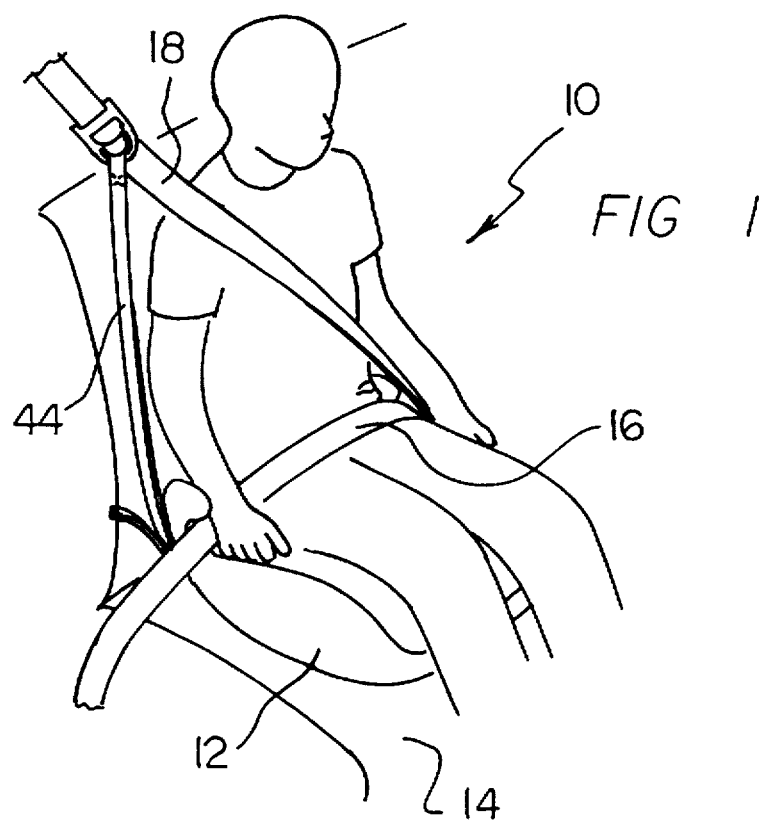
FIG. 1 is a perspective showing of a belt positioner to route the shoulder belt of an auto restraint in operation and use.
Figure 2:
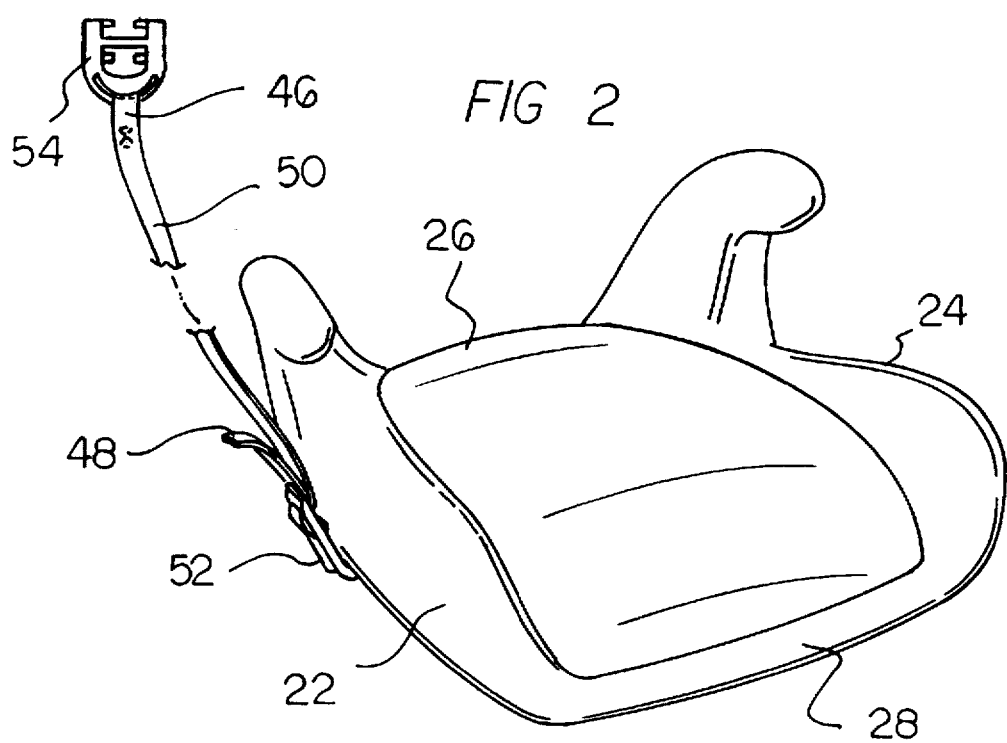
FIG. 2. is a perspective showing of the belt positioner to route the shoulder belt of an auto restraint per se.
Figure 10:
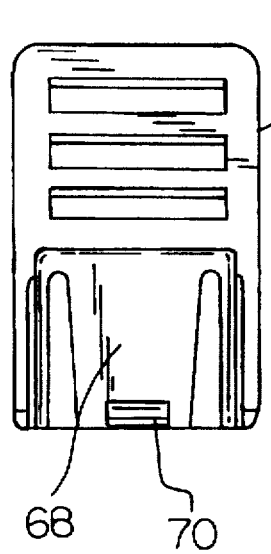
FIGS. 10, 11 and 12 are front, side and top elevational views of the lower buckle.
Figure 11:
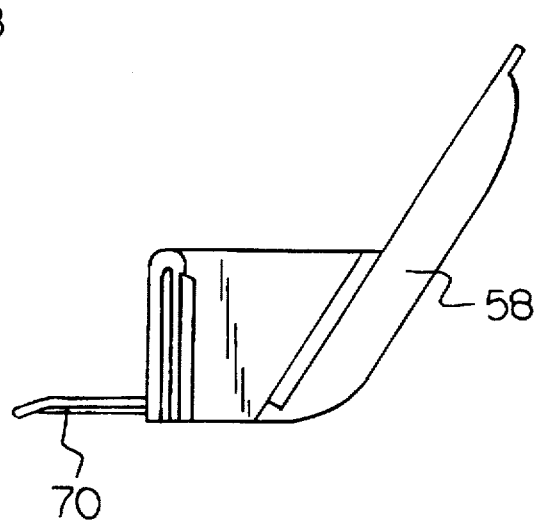
Figure 12:
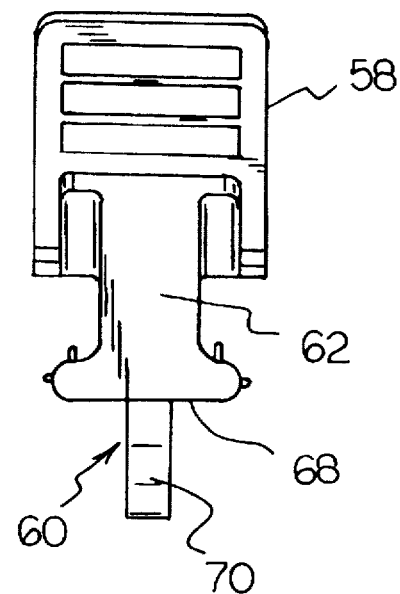

The present invention relates to a belt positioner to route shoulder belt of an auto restraint. In its broadest context, the present invention includes a booster seat and a detachable strap with releasable components at its opposite ends for coupling between the booster seat and a vehicle shoulder belt.

More specifically, the present invention is a system 10 which has as a major component, an vehicle booster seat 12. The booster seat is for use in supporting a child upon a vehicle seat 14 upon which it is positioned during operation and use. The vehicle seat is of the type provided with a safety lap belt 16 and an associated shoulder belt 18. The lap belt and shoulder belt as well as the vehicle seat are conventional in their constructions.

The booster seat is of the type of a conventional variety. It has a first side 22 and a second side 24. The booster seat also has a rearward portion 26 and forward portion 28. Both the first and second sides include an integrally formed upwardly extending rearward side portion 30. Both the first and second sides further include an integrally formed upwardly extending forward side portion 32. Lap belt receiving channels 34 are thus formed intermediate the rearward side portions of the first and second sides.

Also formed in association with the booster seat is a clip receiving groove 38. Such groove is positioned on the first side adjacent to the rearward portion of the seat. A similarly constructed second clip receiving groove 40 is positioned on the second side rearward portion of the seat. Each of the grooves is similarly configured of a rigid plastic material with parallel channels adapted to constitute a female receptor for the removable receipt of a male projection as will be described hereinafter. An upper horizontal stop plate 42 is located at the top of each groove.

Next provided as a component of the system 10 is a shoulder belt positioning strap 44. Such strap is formed to have a first end 46 and a second end 48 and an intermediate extent 50 between the first and second ends. A booster seat side clip 52 is secured to the second or lower end 48 of the belt. A shoulder belt clasp 54 is secured to the first or upper 46 end of the belt.

More specifically, the booster seat clip is formed to have a belt engaging projection or portion 58. In addition, the clip is formed to have a booster seat engaging portion 60. A vertical connector 62 couples the portions 58 and 60 to form an H-shaped cross-sectional configuration when viewed from the top with the H at the top being larger than the H at the bottom.

The belt engaging portion is slidably secured through slots 66 to the first end of the strap for adjustment purposes. The seat engaging portion also has a resilient arm 68 with a tab 70. The seat engaging portion 60 is adapted to be received in either of the two clip receiving grooves 38,40 of a receptor plate as a function of the location of the booster seat with respect to the shoulder strap.

The receptor plate with its grooves 72 are fabricated into the booster seat with opposed vertical, extending recesses 74 for receiving the seat engaging portion 60 of the seat clip 52. Formed integrally with the grooves is an inwardly extending circular recess 76 at the lower end to receive the tab 70. Also formed integrally with the grooves is an upper plate 78 to be contacted by the upper end of the seat engaging portion 60. The upper plate 78 limits the upward movement of the booster seat clip with respect to the booster seat. Removal of the booster seat clip is facilitated through the use of the tab 70. The circular recess 76 is dimensioned to allow a person's finger to pull downwardly on the tab 70 thereby removing the booster seat clip from the booster seat.

The last component of the system 10 is the shoulder belt clip. Such clip has a semi-circular recess 82 at its lower extent 84. Such recess is adapted to receive the second or upper end of the strap at any angle with respect to the shoulder belt. The shoulder belt clip also has an open upper extent 88. An aperture 90 is formed in such upper extent. The aperture includes diametrically opposed inwardly directed protrusions 92. The aperture is thus formed intermediate the upper and lower extents of the shoulder belt clip. The open upper extent and the aperture together are adapted to removably and slidable engage the shoulder belt of the vehicle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A seat system for use in safely and conveniently supporting a child upon a vehicle seat that has both a lap belt and a shoulder belt, the seat system comprising in combination:

a booster seat having a first side, a second side, a rearward portion and a forward portion, both the first and second sides including an integrally formed upwardly extending rearward side portion, both the first and second sides further including an integrally formed upwardly extending forward side portion and a lap belt receiving channel formed intermediate the rearward and forward side portions of the first and second sides, a first clip receiving groove with a stop plate thereabove positioned on the first side rearward portion of the seat, a second clip receiving groove with a stop plate thereabove positioned on the second side rearward portion of the seat;

a shoulder belt positioning strap, the strap having a first end, a second end and an intermediate extent therebetween;

a booster seat clasp secured to the first end of the strap;

a shoulder belt clasp secured to the second end of the strap;

the booster seat clasp having a strap engaging portion and a booster seat engaging portion, the strap engaging portion being slidably secured to the first end of the strap, the seat engaging portion adapted to be removably secured within either of two clip receiving grooves of the seat; and the shoulder belt clasp having a semicircular recess at a lower extent adapted to receive the second end of the strap, the shoulder belt clasp having an opened upper extent, an aperture with diametrically opposed inwardly directed protrusions, the aperture formed intermediate the upper and lower extents of the shoulder belt clasp, the opened upper extent and the aperture together adapted to removably engage the shoulder belt.

2. A device for use in safely positioning a shoulder belt upon a child seated in a booster seat, the device comprising in combination:

a shoulder belt positioning strap, the strap having a first end, a second end and an intermediate extent therebetween;

a shoulder belt clip secured to the second end of the strap; and the shoulder belt clip having a semicircular recess at a lower extent adapted to receive the second end of the strap, the shoulder belt clip having an opened upper extent, an aperture with diametrically opposed inwardly directed protrusions, the aperture formed intermediate the upper and lower extents of the shoulder belt clip, the opened upper extent and the aperture together adapted to removably engage the shoulder belts;

a booster seat clip for removably coupling the strap to a booster seat, the clip having a strap engaging portion and a booster seat engaging portion, the belt engaging portion being slidably secured to the first end of the strap, the seat engaging portion adapted to be removably secured within a clip receiving groove of the booster seat.

3. The device as described in claim 2 wherein the booster seat has first and second sides which include an integrally formed upwardly extending rearward side portion, and wherein both the first and second sides further include an integrally formed upwardly extending forward side portion, a lap belt receiving channel being formed intermediate with rearward and forward side portions of the first and second sides, the lap belt receiving channel adapted to receive the lap belt.

4. A device for use in safely positioning a shoulder belt upon a child seated in a booster seat, the device comprising in combination:

a shoulder belt positioning strap, the strap having a first end, a second end and an intermediate extent therebetween;

means to couple the first end of the strap to a booster seat;

a shoulder belt clip secured to the second end of the strap; and the shoulder belt clip having a semicircular recess at a lower extent adapted to receive the second end of the strap, the shoulder belt clip having an opened upper extent, an aperture with diametrically opposed inwardly directed protrusions, the aperture formed intermediate the upper and lower extents of the shoulder belt clip, the opened upper extent and the aperture together adapted to removably engage the shoulder belt;

wherein the means to couple the strap to the booster seat is a booster seat clip having a strap engaging portion and a booster seat engaging portion, the belt engaging portion being slidably secured to the first end of the strap, the seat engaging portion adapted to be removably secured to a booster seat; and wherein the booster seat has first and second sides which include an integrally formed upwardly extending rearward side portion; and wherein both the first and second sides further include an integrally formed upwardly extending forward side portion, a lap belt receiving channel being formed intermediate with rearward and forward side portions of the first and second sides, the lap belt receiving channel adapted to receive the lap belt; and further comprising a first clip receiving groove positioned on the first side rearward portion of the seat, a second clip receiving groove positioned on the second side rearward portion of the set, either of the two grooves adapted to removably accept the seat clip.

* * * * *